US012607326B2

(12) United States Patent
Wang et al.

(10) Patent No.: US 12,607,326 B2
(45) Date of Patent: Apr. 21, 2026

(54) OPTICAL ASSEMBLY, LINEAR LAMP, LINEAR LAMP COMBINATION, AND TRACK LINEAR LAMP

(71) Applicants: SUZHOU OPPLE LIGHTING CO., LTD., Suzhou City (CN); OPPLE LIGHTING CO., LTD., Shanghai (CN)

(72) Inventors: Wenzhuo Wang, Suzhou City (CN); Junhui Huang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/956,364

(22) Filed: Nov. 22, 2024

(65) Prior Publication Data

US 2025/0084982 A1 Mar. 13, 2025

Related U.S. Application Data

(63) Continuation of application No. PCT/CN2023/084740, filed on Mar. 29, 2023.

(30) Foreign Application Priority Data

May 23, 2022 (CN) ......................... 202221236590.4

(51) Int. Cl.
*F21V 14/02* (2006.01)
*F21S 4/28* (2016.01)
(Continued)

(52) U.S. Cl.
CPC ................ *F21V 14/02* (2013.01); *F21S 4/28* (2016.01); *F21V 5/007* (2013.01); *F21V 7/0066* (2013.01);
(Continued)

(58) Field of Classification Search
CPC ........ F21V 14/02; F21V 5/007; F21V 7/0066; F21V 7/005; F21V 17/12; F21V 17/164; F21V 21/30; F21S 4/28
See application file for complete search history.

(56) References Cited

U.S. PATENT DOCUMENTS

| | | | | |
|---|---|---|---|---|
| 11,435,071 | B1 * | 9/2022 | Henrici | F21V 17/164 |
| 2018/0245780 | A1 * | 8/2018 | Okada | F21V 23/045 |
| 2019/0242547 | A1 * | 8/2019 | Zhang | F21K 9/66 |

FOREIGN PATENT DOCUMENTS

| | | | |
|---|---|---|---|
| CN | 203642109 U | * | 6/2014 |
| CN | 210831841 U | * | 6/2020 |

(Continued)

OTHER PUBLICATIONS

Hao, Surgical lamp component, 2014, CN203642109U, https://worldwide.espacenet.com/patent/search/family/050873351/publication/CN203642109U?q=pn%3DCN203642109U (Year: 2014).*

(Continued)

*Primary Examiner* — Tracie Y Green
*Assistant Examiner* — Michael Chiang
(74) *Attorney, Agent, or Firm* — Arch & Lake LLP; Hao Tan; Shen Wang

(57) ABSTRACT

An optical assembly, a linear lamp, a linear lamp combination and a track linear lamp are provided, the optical assembly includes a light source module, a reflective cup, a lens component, and an anti-glare cup which are sequentially arranged in a height direction, in which an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into a corresponding snap-fit slot, and the reflective cup, the
(Continued)

lens component, and the anti-glare cup are connected in a snap-fit manner.

14 Claims, 9 Drawing Sheets

(51) Int. Cl.

| | |
|---|---|
| ***F21V 5/00*** | (2018.01) |
| ***F21V 7/00*** | (2006.01) |
| ***F21V 17/00*** | (2006.01) |
| ***F21V 17/12*** | (2006.01) |
| ***F21V 17/16*** | (2006.01) |
| ***F21V 21/30*** | (2006.01) |
| *F21Y 103/10* | (2016.01) |

(52) U.S. Cl.

CPC .......... *F21V 7/0083* (2013.01); *F21V 17/005* (2013.01); *F21V 17/12* (2013.01); *F21V 17/164* (2013.01); *F21V 21/30* (2013.01); *F21Y 2103/10* (2016.08)

(56) References Cited

FOREIGN PATENT DOCUMENTS

| | | | | |
|---|---|---|---|---|
| CN | 211372036 | U | * | 8/2020 |
| CN | 212005342 | U | | 11/2020 |
| CN | 212901339 | U | | 4/2021 |
| CN | 217235506 | U | | 8/2022 |
| EP | 3957905 | A1 | | 2/2022 |

OTHER PUBLICATIONS

Xiao, Reflective cup module and line lamp, 2020, CN210831841U, https://worldwide.espacenet.com/patent/search/family/071260614/publication/CN210831841U?q=pn%3DCN210831841U (Year: 2020).*

Chen, Novel vertical guide rail lamp structure, 2020, CN211372036U, https://worldwide.espacenet.com/patent/search/family/072153141/publication/CN211372036U?q=pn%3DCN211372036U (Year: 2020).*

International Search Report of PCT/CN2023/084740 dated Jul. 31, 2023 with English translation.

* cited by examiner

OPTICAL ASSEMBLY, LINEAR LAMP, LINEAR LAMP COMBINATION, AND TRACK LINEAR LAMP

This application is based upon and claims the priority of PCT patent application PCT/CN2023/084740 filed on Mar. 29, 2023 which claims priority to the Chinese patent application No. 202221236590.4 filed on May 23, 2022, the entire contents of which are hereby incorporated by reference herein for all purposes.

TECHNICAL FIELD

The disclosure relates to an optical assembly, a linear lamp, a linear lamp combination and a track linear lamp, and belongs to the technical field of lighting.

BACKGROUND

Sometimes, a rotatable structure is arranged between the lamp holder and the lamp body of the track linear lamp to adjust the light source irradiation direction of the lamp body and improve the practicability of the track lamp.

SUMMARY

This disclosure provides an optical assembly, a linear lamp, a linear lamp and a track linear lamp.

This disclosure provides an optical assembly, which may include a light source module, a reflective cup, a lens component, and an anti-glare cup which are sequentially arranged in a height direction, in which an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into a corresponding snap-fit slot, and the reflective cup, the lens component, and the anti-glare cup are connected in a snap-fit manner.

This disclosure further provides a linear lamp, which may include a lamp body and any one of the above-mentioned optical assemblies accommodated in the lamp body.

This disclosure further provides a linear lamp combination, which may include an adapter and a linear lamp fixedly connected with the adapter, in which the linear lamp comprises a lamp body and any one of the above-mentioned optical assemblies accommodated in the lamp body.

It is to be understood that both the foregoing general description and the following detailed description are exemplary and explanatory only and are not restrictive of the present disclosure.

DETAILED DESCRIPTION

Figure 1:
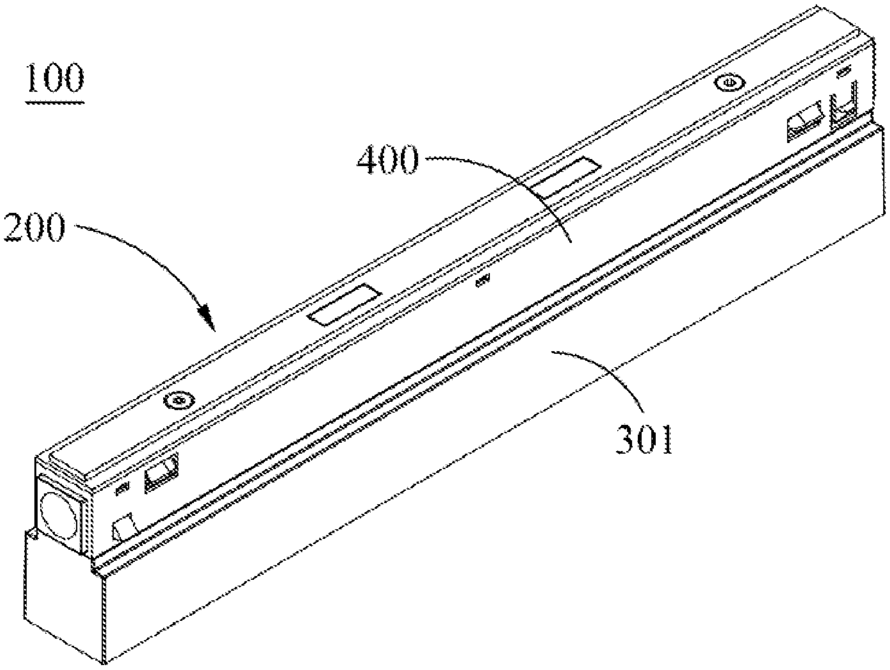
FIG. 1 is a stereogram of a track linear lamp in accordance with an example of the present disclosure.

In order to make the purpose, technical scheme and advantages of this disclosure clear, the disclosure will be described in detail with the attached drawings and examples.

Descriptions of reference numerals may include: 100—track linear lamp, 200—linear lamp combination, 300—linear lamp, 400—adapter, 301—lamp body, 302—lamp holder, 303—rotating shaft, 304—cable, 305—lamp head;

- 1—optical assembly, 11—light source module, 111—through hole, 112—light source board, 12—reflective cup, 121—snap-fit slot, 122—support post, 123—connecting member, 124—connecting hole, 125—bump, 126—channel, 127—reflecting cavity, 128—large hole, 129—small hole, 13—lens component, 131—first hook, 132—groove, 133—prism surface, 134—through hole, 14—anti-glare cup, 141—anti-glare cavity, 142—large end, 143—small end, 144—second hook;
- 2—main body part, 3—connecting part, 31—fixing hole, 32—positioning post, 33—locking piece, 4—adapting groove;
- 5—adapting part, 51—fixing hole, 52—rotating hole, 53—position limiting piece, 54—anti-skid piece, 6—connecting groove, 7—rotating part, 71—position limiting groove, 8—fixing part, 81—positioning groove, 82—locking groove, 9—through hole.

Sometimes, a rotatable structure is arranged between the lamp holder and the lamp body of the track linear lamp to adjust the light source irradiation direction of the lamp body and improve the practicability of the track lamp. However, the rotatable structure is arranged between the lamp body and the lamp holder, the installation position of the rotatable structure cannot be accurately controlled during installation, which makes the track linear lamp unable to realize the rotatable function or shorten the service life. Secondly, even if the rotatable structure can be accurately installed in a given position, the rotatable structure will slip during use, resulting in the lamp body being unable to illuminate at a certain angle.

Meanwhile, the optical assemblies installed on the lamp body are usually fixed in a snap-fit manner, that is, the anti-glare lampshade and the reflective cup are connected in a snap-fit manner, and the lens is squeezed between the anti-glare lampshade and the reflective cup, which makes it difficult to assemble the lens accurately between the anti-glare lampshade and the reflective cup during the assembly process. Moreover, most of the existing reflective cups are directly connected with the light source board through screws, and in the assembly process, the reflective cups are easy to abut against the lamp beads on the light source board, resulting in the damage of the lamp beads.

In view of this, it is really necessary to improve the existing optical assemblies and track linear lamps to solve the above problems.

Here, it should be noted that in order to avoid obscuring this disclosure with unnecessary details, only the structure and/or processing steps closely related to the scheme of this disclosure are shown in the attached drawings, while other details that are not related to this disclosure are omitted.

In addition, it should be noted that the terms “including”, “include”, “comprising”, “comprise” or any other variation are intended to cover non-exclusive inclusion, so that a process, a method, an article or an apparatus including a series of elements includes not only those elements, but also other elements not explicitly listed, or elements inherent to such process, method, article or apparatus.

Figure 2:
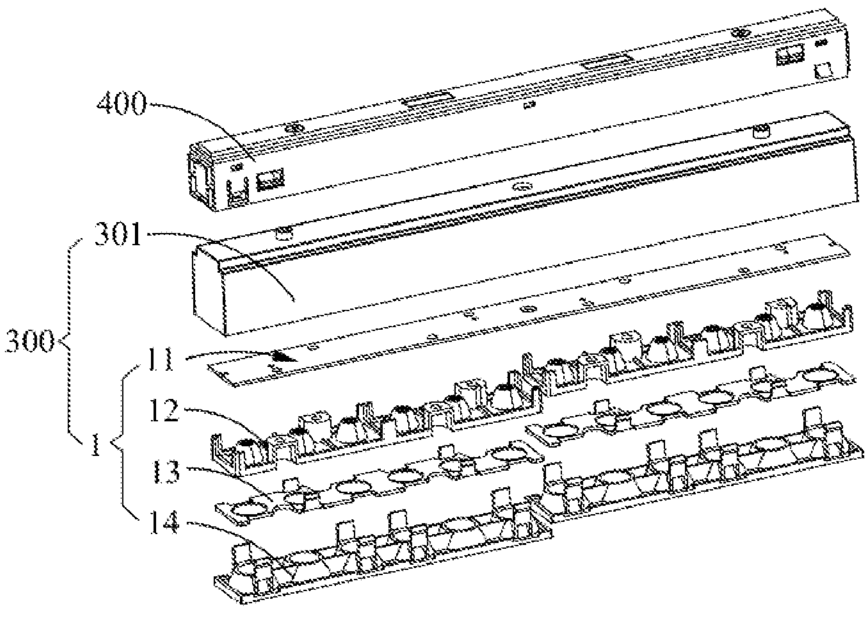
FIG. 2 is an exploded view of a track linear lamp in accordance with an example of the present disclosure.
Figure 3:
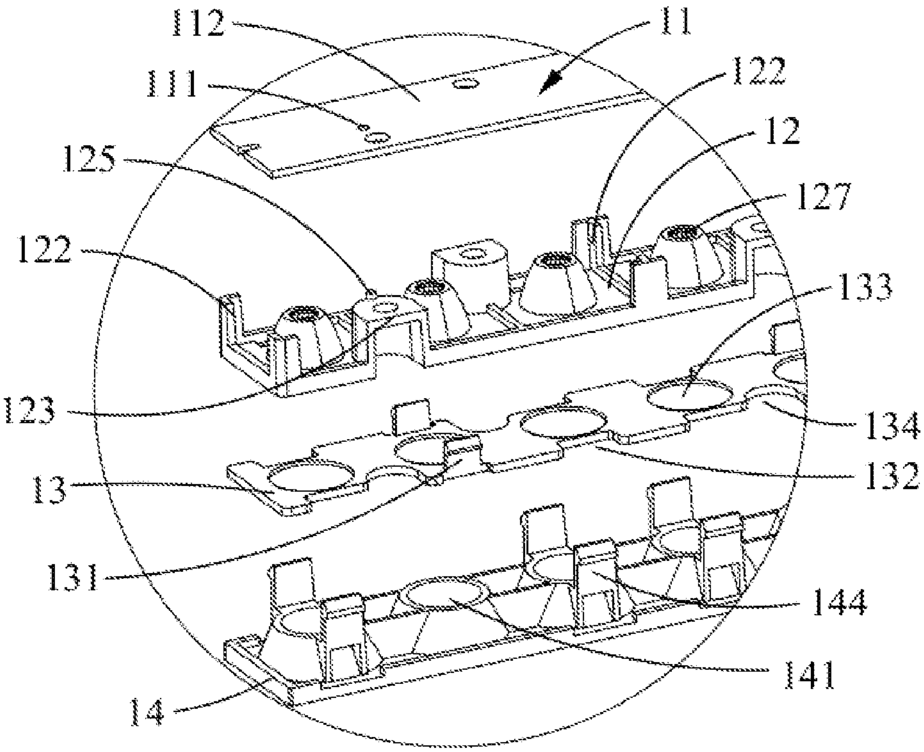
FIG. 3 is a partial enlarged view of a light source module, a reflective cup, a lens component and an anti-glare cup in accordance with an example of the present disclosure.
Figure 4:
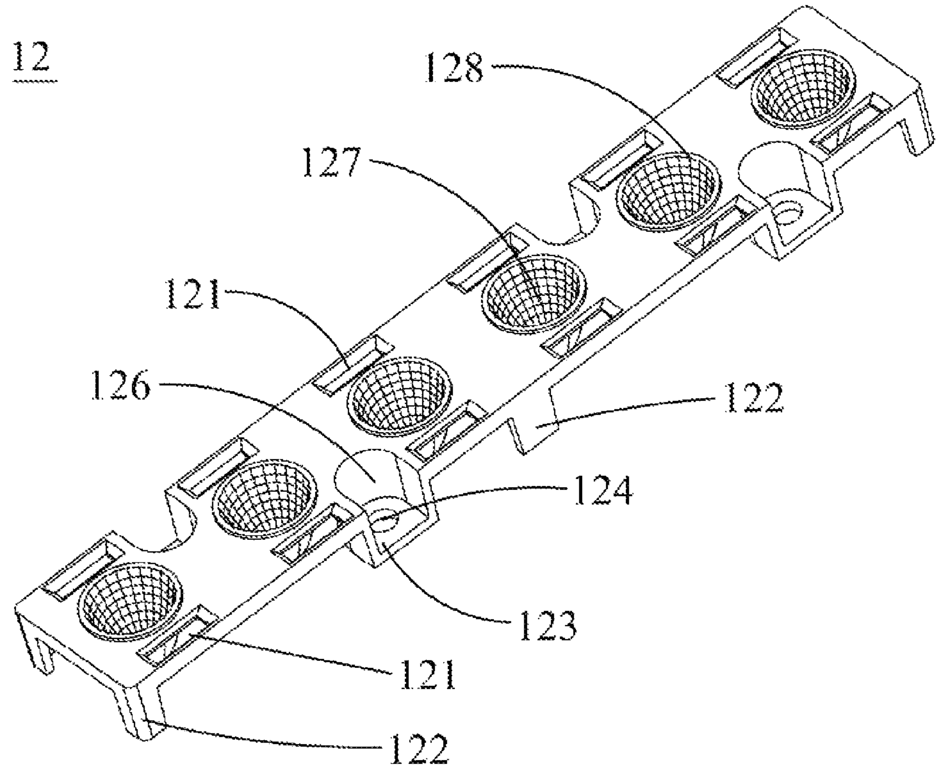
FIG. 4 is a schematic stereogram of a reflective cup in accordance with an example of the present disclosure.
Figure 5:
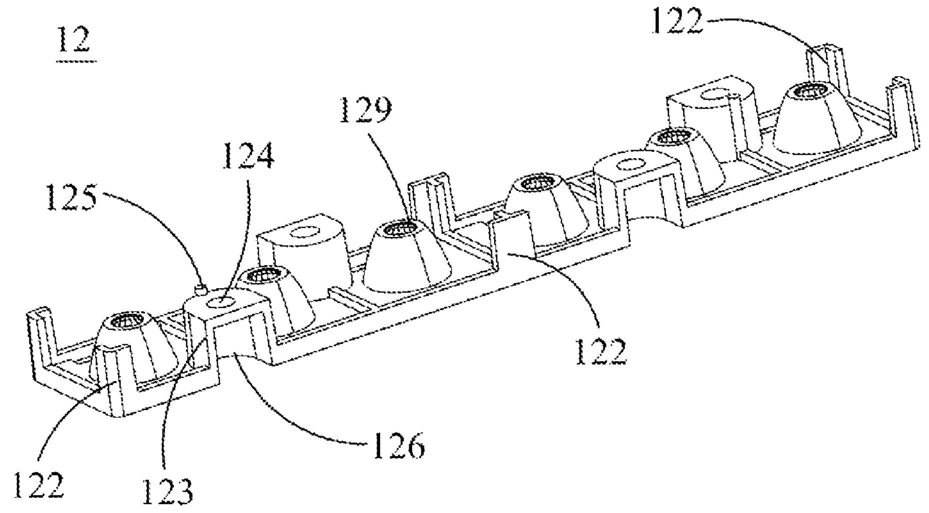
FIG. 5 is a stereogram of the reflective cup in accordance with an example of the present disclosure at another angle.
Figure 6:
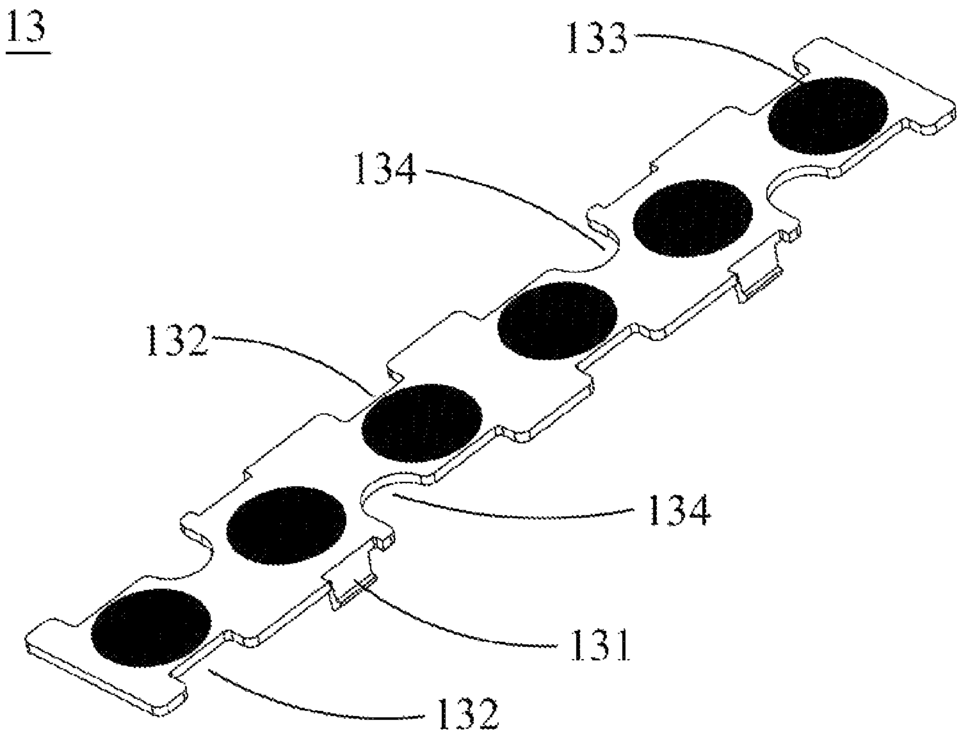
FIG. 6 is a schematic stereogram of a lens component in accordance with an example of the present disclosure.
Figure 7:
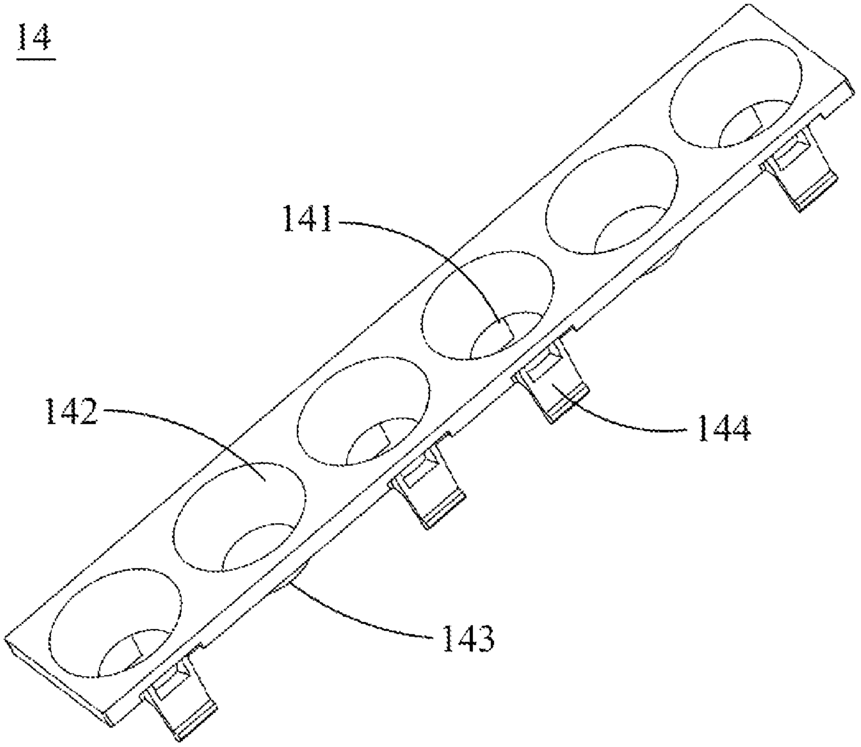
FIG. 7 is a schematic stereogram of an anti-glare cup in accordance with an example of the present disclosure.

Referring to FIG. 1 and FIG. 2, the present disclosure discloses a track linear lamp 100 for mobile lighting. The track linear lamp 100 includes a track (not shown) and a linear lamp combination 200, the linear lamp combination 200 includes an adapter 400 and a linear lamp 300. Specifically, the track is fixedly installed on a wall or ceiling, the adapter 400 is accommodated in the track and can slide along the track, and the adapter 400 and the linear lamp 300 are fixedly connected, so that the adapter 400 can drive the linear lamp 300 to slide along the track, thus realizing mobile lighting of the linear lamp combination 200. Preferably, the adapter 400 and the linear lamp 300 can be fixedly connected by one or more of screws, rivets, adhesive or buckles.

The adapter 400 is electrically connected with the track. The linear lamp 300 includes a cable 304. One end of the cable 304 passes through the linear lamp 300 and is connected with the light source module 11 installed in the linear lamp 300, and the other end of the cable 304 is connected with the adapter 400, so that the adapter 400 can supply power to the light source module 11.

In this disclosure, the structure of the track in the track linear lamp 100, the structure of the adapter 400 and the connection mode between the adapter 400 and the track can all be designed according to the prior art, and will not be described in detail here. The specific structure of the linear lamp 300 will be described in detail below.

Referring to FIG. 1 and FIG. 2, in an example of the present disclosure, the linear lamp 300 includes a lamp body 301 and an optical assembly 1 accommodated in the lamp body 301. Specifically, one side of the lamp body 301 is fixedly connected with an adapter 400, and at least part of the lamp body 301 is accommodated in a track, so that the lamp body 301 can slide along the track under the drive of the adapter 400. Preferably, the lamp body 301 is completely accommodated in the track, so that the direct illumination of the linear lamp 300 is realized and the linear lamp 300 is not exposed, and the appearance of the linear lamp 300 is beautiful.

The side of the lamp body 301 far away from the adapter 400 is a light outlet (not shown), and the light outlet is recessed inward to form an accommodation space, and the optical assembly 1 is accommodated in the accommodation space to cover the accommodation space, thus realizing the sealing of the linear lamp 300. Preferably, the lamp body 301 is arranged in a rectangular shape, and the optical assembly 1 is embedded in the lamp body 301.

The optical assembly 1 includes a light source module 11, a reflective cup 12, a lens component 13, and an anti-glare cup 14 which are sequentially arranged in a height direction. Specifically, the light source module 11 is installed in the lamp body 301, and the reflective cup 12 is fixedly connected with the light source module 11, and the anti-glare cup 14 is fixedly connected with the reflective cup 12, and the lens component 13 is fixed between the reflective cup 12 and the anti-glare cup 14, so that light emitted from the light source module 11 can pass through the reflective cup 12, the lens component 13, and the anti-glare cup 14 in turn and emits outwards from the light outlet.

In this example, two optical assemblies 1 are arranged in the lamp body 301. Of course, in other examples, only one optical assembly 1 or a plurality of optical assemblies 1 can be arranged in the lamp body 301, and the plurality of optical assemblies 1 are respectively connected with the light source module 11 to cover the accommodation space in the lamp body 301.

Referring to FIG. 3 to FIG. 7, the light source module 11 includes a light source board 112 and a plurality of lamp beads (not shown) fixed on the light source board 112. The reflective cup 12 is provided with a plurality of reflecting cavities 127 corresponding to the lamp beads, the lens component 13 is formed with a plurality of prism surfaces 133 corresponding to the reflecting cavities 127, and the anti-glare cup 14 is provided with a plurality of anti-glare cavities 141 corresponding to the reflecting cavities 127, so that the light emitted from the lamp beads can be first reflected by the reflecting cavities 127, then passes through the prism surface 133, and finally passes through the anti-glare cup 14 and emits outwards from the light outlet.

The whole reflective cup 12 is surface treated by electroplating process to enhance the reflection effect of light and improve the light efficiency of the linear lamp 300. Both ends of the reflecting cavity 127 are respectively provided with a large hole 128 and a small hole 129, the small hole 129 is arranged at one end close to the lamp bead, and the large hole 128 is arranged at one end far away from the lamp bead. The small hole 129 is matched with the lamp bead, and the lamp bead can be accommodated in the small hole 129, so that the light emitted from the lamp bead can be emitted through the reflection of the reflecting cavity 127. Of course, in other examples, the lamp bead may not be completely accommodated in the small hole 129.

The inner side wall of the reflecting cavity 127 is arranged in a fish-scale shape. Because the light emitted from the lamp bead is divergent, the light will change from divergent light to linear light beam after passing through the fish-scale reflecting cavity 127, and it will be emitted outward through the large hole 128, so that the reflective cup 12 can control the emission path of the light and reduce the loss of the light in the transmission process.

The size and shape of the prism surface 133 are matched with the size and shape of the large hole 128, respectively, so that the light directly enters the prism surface 133 after passing through the large hole 128. The prism surface 133 is provided with an optical microstructure, specifically a polygonal prism, which makes the light more uniform after passing through the prism surface 133 and achieves the effect of light mixing.

The anti-glare cavity 141 includes a large end 142 and a small end 143, and the small end 143 corresponds to the prism surface 133, so that light passing through the prism surface 133 enters the small end 143 and then exits from the large end 142. The distance between the large end 142 and the prism surface 133 is much larger than that between the small end 143 and the prism surface 133. In the vertical direction, when the user sees the lamp bead, the angle between the user and the lamp bead becomes smaller, that is, the user can only see the lamp bead when standing under the lamp bead in a certain range, which improves the anti-glare effect of the optical assembly 1 and enables the user to obtain a better use experience.

The edge of the reflective cup 12 is provided with snap-fit slots 121, and the edge of the lens component 13 is recessed inward to form grooves 132, and the grooves 132 correspond to at least part of the snap-fit slots 121. The edge of the lens component 13 is further provided with first hooks 131 in a protruding manner, the first hooks 131 and the grooves 132 are spaced apart from each other, and the first hooks 131 can be inserted into the corresponding snap-fit slots 121 to realize the snap-fit connection between the lens component 13 and the reflective cup 12.

The edge of the anti-glare cup 14 is provided with second hooks 144 in a protruding manner, and the second hooks 144 and the first hooks 131 extend in the same direction. The second hooks 144 correspond to the grooves 132, so that the second hooks 144 can pass through the grooves 132 and be inserted into the corresponding snap-fit slots 121 to realize the snap-fit connection between the anti-glare cup 14 and the reflective cup 12. Specifically, the snap-fit slots 121, the grooves 132, the first hooks 131, and the second hooks 144 are all arranged in pairs. The number of the snap-fit slots 121 is the sum of the number of the first hooks 131 and the number of the second hooks 144, and the number of the grooves 132 is the same as that of the second hooks 144. Preferably, there are twelve snap-fit slots 121, eight grooves 132, four first hooks 131, and eight second hooks 144.

The optical assembly 1 further includes a fixing piece (not shown), and the reflective cup 12 is provided with a connecting member 123 and a connecting hole 124 formed in the connecting member 123. Specifically, the connecting member 123 extends from the reflective cup 12 toward the light source board 112, and the connecting hole 124 is formed at one end of the connecting member 123 close to the light source board 112 and penetrates the connecting member 123, so that the fixing piece can pass through the connecting hole 124 and be connected with the light source board 112, thereby fixedly connecting the reflective cup 12 and the light source module 11. Preferably, there are four connecting members 123 which are evenly distributed on the two long-side edges of the reflective cup 12. One side of the connecting member 123 flush with the long-side edges of the reflective cup 12 is recessed inward to form a channel 126 through which the fixing piece can pass, and the connecting hole 124 is communicated with the channel 126, so that the fixing piece can pass through the channel 126 and the connecting hole 124 to realize the fixed connection between the reflective cup 12 and the light source board 112. Preferably, the fixing piece is a screw, and the light source board 112 is correspondingly provided with a screw hole.

In this example, the long-side edge of the lens component 13 is recessed inward to form a through hole 134, and the through hole 134 is arranged corresponding to the connecting hole 124, so that the fixing piece can pass through the through hole 134 and the connecting hole 124 to fixedly connect the reflective cup 12 and the light source board 112. In this way, the lens component 13 can be connected with the reflective cup 12 in a snap-fit manner, and then the reflective cup 12 and the light source board 112 can be fixedly connected. Of course, in other examples, the lens component 13 may not be provided with the through hole 134, and the reflective cup 12 is fixedly connected with the light source board 112 first, and then the lens component 13 is connected with the reflective cup 12 in a snap-fit manner.

One end of the connecting member 123 far away from the reflective cup 12 is further provided with a bump 125, and the light source board 112 is correspondingly provided with a through hole 111 matched with the bump 125. When the reflective cup 12 is connected with the light source board 112, the bump 125 can be accommodated in the through hole 111, so as to realize the positioning between the reflective cup 12 and the light source board 112, reduce the installation error between the reflective cup 12 and the light source board 112, and avoid the optical abnormality of the optical assembly 1. In this example, only two connecting members 123 near the short-side edges of the reflective cup 12 are provided with the bumps 125, so as to realize the positioning between the reflective cup 12 and the light source board 112. Of course, all the connecting members 123 may be provided with the bumps 125 to further enhance the positioning accuracy between the reflective cup 12 and the light source board 112, and there is no limitation herein.

The reflective cup 12 is further provided with a support post 122 which is arranged on the same side of the reflective cup 12 with the connecting member 123 and protrudes toward the light source board 112. The end of the support post 122 close to the light source board 112 is flush with the end of the connecting member 123 close to the light source board 112, so that when the reflective cup 12 is connected with the light source board 112, the support post 122 and the connecting member 123 can be used to abut against the light source board 112, so as to keep a certain distance between the reflective cup 12 and the light source board 112, and to avoid the lamp bead from being damaged due to the contact between the reflecting cavity 127 and the lamp bead. Preferably, there are six support posts 122 which are evenly distributed on the two long-side edges of the reflective cup 12. In this example, there are two types of support posts 122 which are L-shaped and T-shaped, respectively. Four L-shaped support posts 122 are located at the four corners of the reflective cup 12, and two T-shaped support posts 122 are located at the middle of the two long sides of the reflective cup 12. Of course, in other examples, the shape and number of support posts 122 can be set according to the actual situation, and there is no limitation herein.

Figure 8:
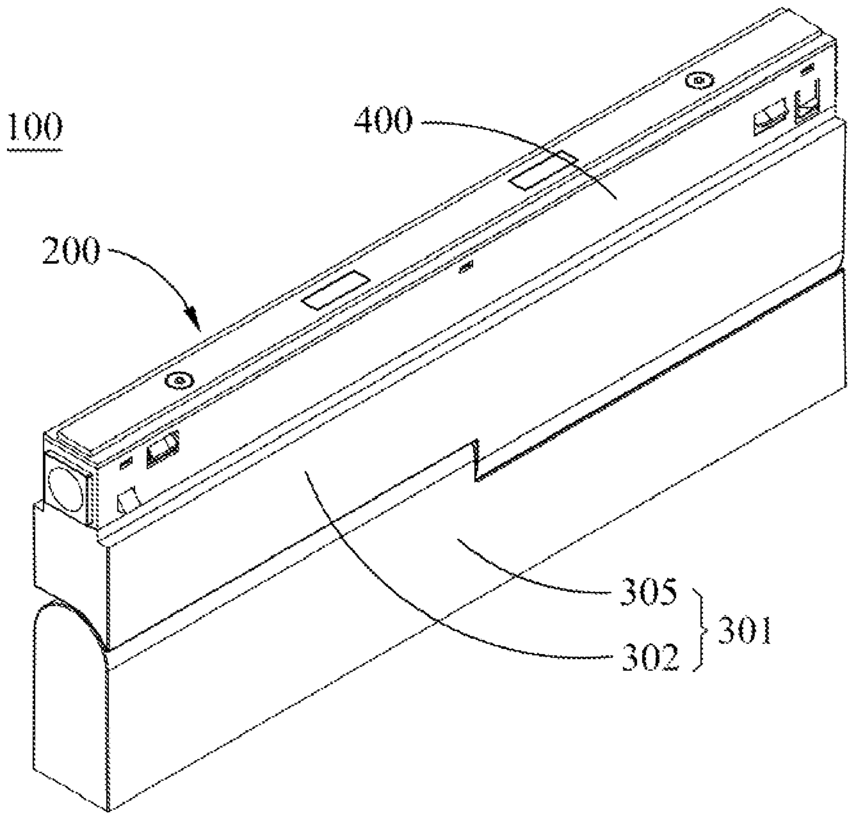
FIG. 8 is a stereogram of a track linear lamp in accordance with another example of the present disclosure.
Figure 9:
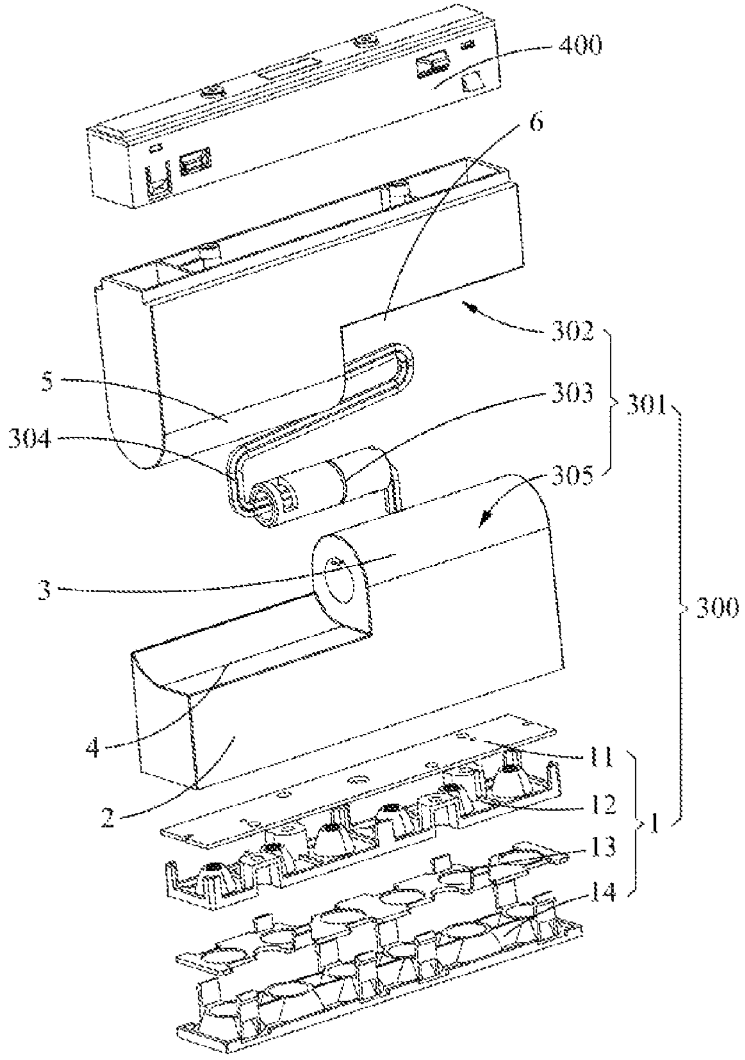
FIG. 9 is an exploded view of a track linear lamp in accordance with another example of the present disclosure.

Please refer to FIG. 8 and FIG. 9, in another example of the disclosure, the lamp body 301 includes a lamp holder 302, a lamp head 305 and a rotating shaft 303 connecting the lamp holder 302 and the lamp head 305. The rotating shaft 303 is arranged at the joint of the lamp holder 302 and the lamp head 305, so that the lamp head 305 can rotate relative to the lamp holder 302, thereby realizing illumination at different angles, and improving the practicability of the linear lamp 300. The side of the lamp holder 302 far away from the lamp head 305 is fixedly connected with the adapter 400, and at least part of the lamp holder 302 is accommodated in the track, so that on the one hand, the linear lamp 300 can slide along the track when being driven by the adapter 400, on the other hand, the exposure of the lamp holder 302 is reduced to improve the aesthetics of the track linear lamp 100, and moreover, the lamp head 305 can be prevented from abutting against the track after rotating.

The lamp head 305 includes a main body part 2, a connecting part 3 extending outward from the main body part 2, and an adapting groove 4 surrounded and delimited by the connecting part 3 and the main body part 2. That is to say, the top of the lamp head 305 is divided into two parts, one part protrudes upward to form the connecting part 3, and the other part is recessed downward to form the adapting groove 4. The overall configuration of the lamp head 305 is generally L-shaped. Specifically, the optical assembly 1 is accommodated in the main body part 2, and the structure of the optical assembly 1 is the same as that of the optical assembly 1 mentioned above, so it will not be described in detail herein. The following will mainly describe the specific structure and matching relationship of the lamp head 305, the lamp holder 302 and the rotating shaft 303.

Figure 10:
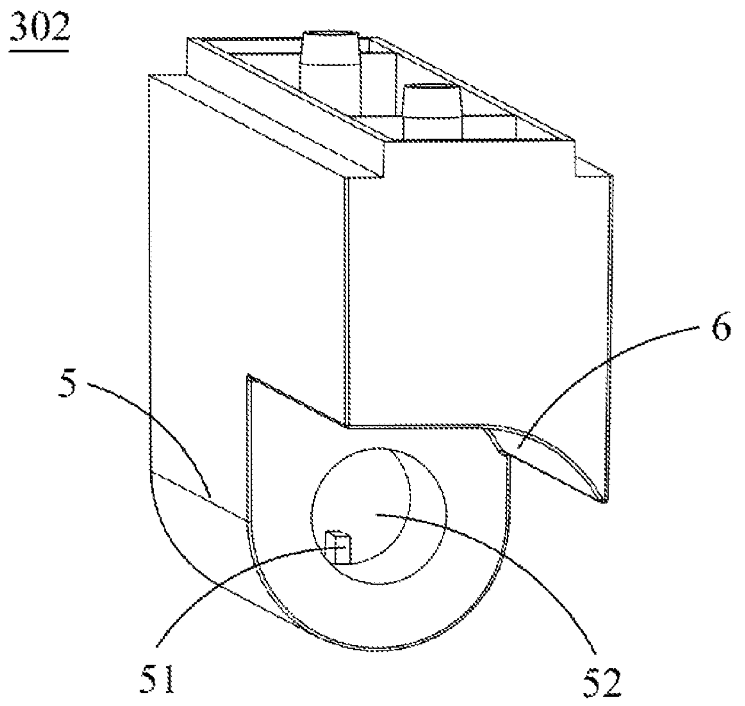
FIG. 10 is a schematic stereogram of a lamp holder in accordance with another example of the present disclosure.
Figure 11:
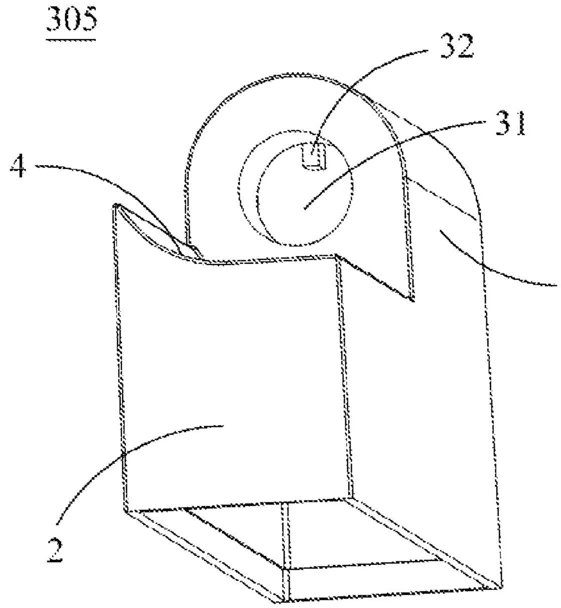
FIG. 11 is a schematic stereogram of a lamp head in accordance with another example of the present disclosure.
Figure 12:
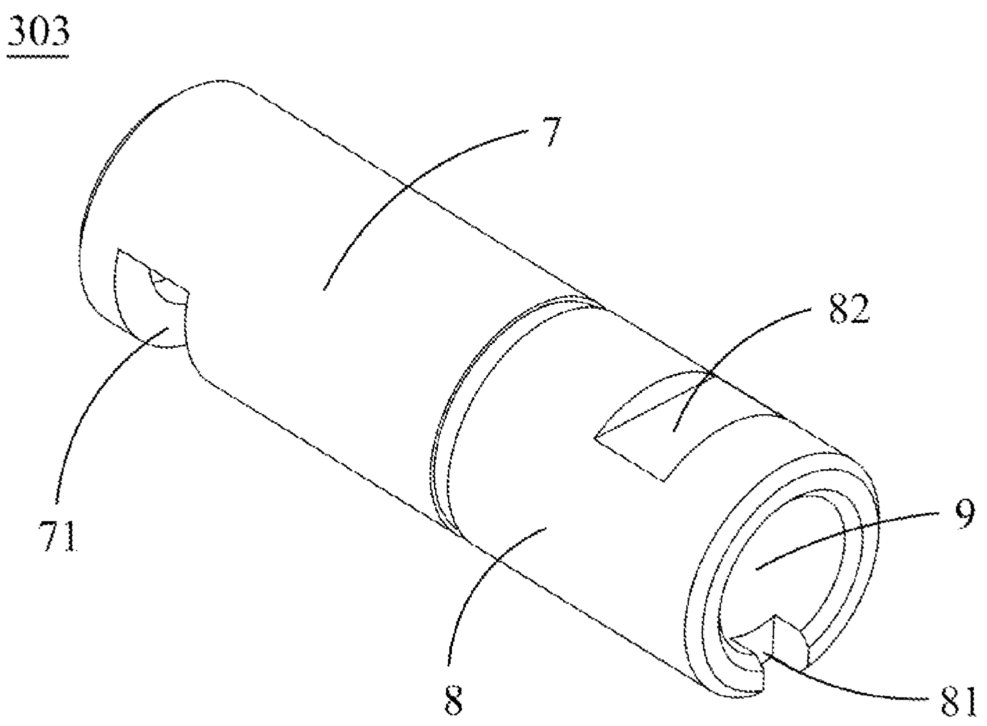
FIG. 12 is a schematic stereogram of a rotating shaft in accordance with another example of the present disclosure.
Figure 13:
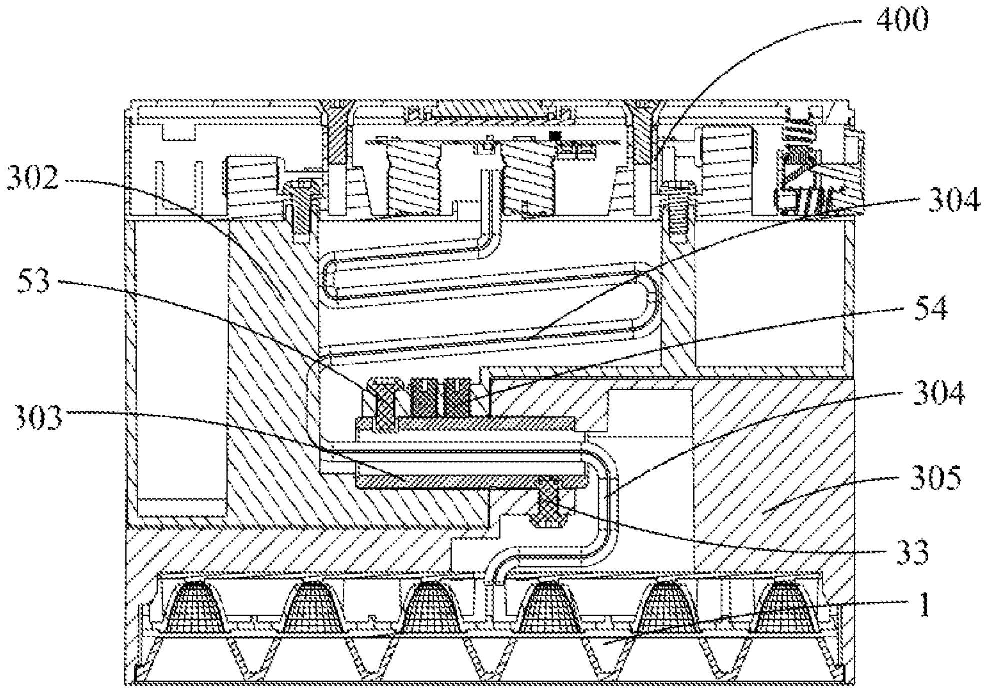
FIG. 13 is a sectional view of a track linear lamp in accordance with another example of the present disclosure.

Please refer to FIG. 9 to FIG. 11, the end of the lamp holder 302 far away from the adapter 400 is provided with an adapting part 5 and a connecting groove 6 located beside the adapting part 5. Specifically, the adapting part 5 is formed by extending outward from the end of the lamp holder 302 far away from the adapter 400, and the connecting groove 6 is formed by being surrounded and delimited by the adapting part 5 and the lamp holder 302. That is to say, the bottom of the lamp holder 302 is divided into two parts, one part of which protrudes downward to form the adapting part 5 and the other part of which is recessed upward to form a connecting groove 6. The overall configuration of the lamp holder 302 is generally L-shaped. The connecting part 3 and the connecting groove 6 correspond to each other and the connecting part 3 can be accommodated in the connecting groove 6, and the adapting part 5 and the adapting groove 4 correspond to each other and the adapting part 5 can be accommodated in the adapting groove 4 to realize the embedded connection between the lamp holder 302 and the lamp head 305. The rotating shaft 303 is arranged between the connecting part 3 and the adapting part 5 and partially extends into the connecting part 3 and the adapting part 5, so that the connecting part 3 is rotatably connected with the adapting part 5 through the rotating shaft 303.

Please refer to FIG. 9 to FIG. 13, the rotating shaft 303 is arranged in a cylindrical shape, with one end being the rotating part 7 and the other end being the fixing part 8. The adapting part 5 is provided with a rotating hole 52 extending along the long side of the lamp holder 302, and the rotating part 7 is accommodated in the rotating hole 52 to realize the connection between the rotating shaft 303 and the lamp holder 302. The connecting part 3 is provided with a fixing hole 31 extending along the long side of the lamp head 305, and the fixing part 8 is accommodated in the fixing hole 31 to realize the connection between the rotating shaft 303 and the lamp head 305.

The rotating part 7 is provided with a position limiting groove 71, and a position limiting piece 53 is arranged in the adapting part 5, and the position and the shape of the position limiting piece 53 are matched with the position and the shape of the position limiting groove 71, respectively. Specifically, the position limiting groove 71 is arranged in the outer side wall of the rotating part 7 in a strip shape, and the position limiting piece 53 extends into the rotating hole 52 from the adapting part 5, and the position limiting piece 53 at least partially extends into the position limiting groove 71 and can slide in the position limiting groove 71, so that the rotating shaft 303 can rotate relative to the adapting part 5. When the rotating shaft 303 rotates at a certain angle with respect to the adapting part 5, the adapting part 53 is configured to abut against the inner side wall of one end of the position limiting groove 71, so as to limit the sliding distance of the adapting part 53 in the position limiting groove 71, and further limit the rotation angle of the rotating shaft 303 with respect to the adapting part 5.

The adapting part 5 is further provided with an abutting post 51, specifically, the abutting post 51 is arranged in the rotating hole 52, and the end of the rotating part 7 far away from the fixing part 8 can abut against the abutting post 51 to limit the length of the rotating shaft 303 extending into the rotating hole 52, so that the rotating part 7 can rub against the abutting post 51 during the rotating process of the rotating shaft 303, on the one hand, the rotating shaft 303 can be fixed at a specific angle by the friction between the rotating part 7 and the abutting post 51.

An anti-skid piece 54 is further arranged in the adapting part 5, the anti-skid piece 54 extends from the top of the adapting part 5 toward the inside of the rotating hole 52, so that one end of the anti-skid piece 54 abuts against the outer side wall of the rotating shaft 303 and the other end of the anti-skid piece 54 is accommodated in the adapting part 5. Friction can be generated upon the anti-skid part 54 abutting against the outer wall of the rotating shaft 303, so that the rotating shaft 303 and the anti-skid part 54 can remain relatively stationary or can relatively slide, that is, the rotating shaft 303 can be fixed at a specific angle by using the anti-skid part 54 without an external force. Under the action of an external force, the rotating shaft 303 can slide relative to the anti-skid piece 54.

Preferably, the anti-skid piece 54 is a damping screw 54. In this example, there are two damping screws 54, both of which are arranged in the adapting part 5 to enhance the anti-skid performance. Of course, in other examples, the number of the damping screws 54 can be set to one or more, and the damping screws 54 can also be arranged in the connecting groove 6, that is, they extend into the connecting groove 6 from the inside of the lamp holder 302, so that one end of each of the damping screws 54 abuts against the connecting part 3 to realize the anti-skid effect of the damping screw 54.

The fixing part 8 is provided with a locking groove 82 and a positioning groove 81. Specifically, the locking groove 82 is a notch arranged on the outer side wall of the fixing part 8, and the positioning groove 81 is arranged at one end of the fixing part 8 far away from the rotating part 7, and is recessed inward from the edge of the fixing part 8. A positioning post 32 corresponding to the positioning groove 81 and a locking piece 33 corresponding to the locking groove 82 are arranged in the connecting part 3. Specifically, both the positioning post 32 and the locking piece 33 extend from the connecting part 3 toward the fixing hole 31, and the positioning post 32 and the locking piece 33 are oppositely arranged in the fixing hole 31. During connection, the positioning post 32 extends into the positioning groove 81, and the locking piece 33 abuts against the locking groove 82 to fix the fixing part 8 in the fixing hole 31, so that the connecting part 3 is fixedly connected with the rotating shaft 303 and can rotate synchronously with the rotating shaft 303.

That is to say, after the lamp head 305 and the lamp holder 302 are connected through the rotating shaft 303, the fixing part 8 is accommodated in the fixing hole 31, and the fixing part 8 and the lamp head 305 are fixedly connected through the cooperation of the positioning post 32 and the locking piece 33 with the positioning groove 81 and the locking groove 82, respectively. The rotating part 7 is accommodated in the rotating hole 52, and the rotating part 7 can rotate within a certain angle range relative to the lamp holder 302 through the mutual cooperation of the position limiting piece 53 and the position limiting groove 71, and the rotating shaft 303 can be fixed at a specific angle through the damping screw 54 without an external force. Meanwhile, through the mutual cooperation between the positioning post 32 and the abutting post 51, the rotating shaft 303 can be limited between the connecting part 3 and the adapting part 5, so as to avoid the rotating shaft 303 from being displaced during use. Preferably, both the position limiting piece 53 and the locking piece 33 are screws.

The rotating shaft 303 is also provided with a through hole 9 which runs through the rotating part 7 and the fixing part 8 along the rotating axis of the rotating shaft 303. The linear lamp 300 further includes a cable 304. One end of the cable 304 passes through the lamp holder 302 and is connected with the adapter 400, while the other end of the cable 304 passes through the through hole 9 and enters the lamp head 305 and is electrically connected with the optical assembly 1 in the lamp head 305 to supply power to the optical assembly 1.

To sum up, in the track linear lamp 100 of the present disclosure, the reflective cup 12 of the optical assembly 1 is provided with snap-fit slots 121, the lens component 13 is provided with the first hooks 131 and the grooves 132 that correspond to the snap-fit slots 121, and the anti-glare cup 14 is provided with the second hooks 144, so that the lens component 13 and the anti-glare cup 14 can be fixed with the reflective cup 12 in a snap-fit manner, and the accurate installation of the lens component 13 and convenient assembly of the optical assembly 1 are realized. By arranging the support post 122 on the reflective cup 12, it can be avoided that the reflecting cavity 127 abuts against the lamp bead, resulting in the lamp bead being damaged. By arranging the through holes 134 in the lens component 13, the diversity of the assembly of the optical assembly 1 is realized. By arranging the rotating shaft 303 between the lamp holder 302 and the lamp head 305, the lamp head 305 can rotate relative to the lamp holder 302 to meet the lighting requirements of objects with different heights. The positioning post 32 and the abutting post 51 are used to limit the position of the rotating shaft 303 in the connecting part 3 and the adapting part 5, so as to prevent the rotating shaft 303 from being displaced during use. By arranging the anti-skid piece 54 abutting against the rotating shaft 303 on the lamp holder 302, it is realized that the rotating shaft 303 can remain stationary relative to the adapting part 5, which can not only meet the different needs of customers, but also meet the needs of different lighting scenes.

The purpose of the disclosure is to provide an optical assembly, a linear lamp, a linear lamp combination and a track linear lamp, so as to solve at least one of the following problems: the lens component cannot be accurately installed, the lamp beads are easily to be damaged by the reflective cup, the rotating shaft cannot be accurately installed in a predetermined position, and the lamp body cannot be fixed in a specific angle after assembly.

In order to achieve the above purpose, the disclosure provides an optical assembly, which includes a light source module, a reflective cup, a lens component, and an anti-glare cup which are sequentially arranged in a height direction, in which an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into a corresponding snap-fit slot, and the reflective cup, the lens component, and the anti-glare cup are connected in a snap-fit manner.

As a further improvement of the disclosure, the edge of the lens component is recessed inward to form a groove, and the groove and the snap-fit slot at least partially correspond to each other, so that the second hook passes through the groove and is inserted into the corresponding snap-fit slot.

As a further improvement of the disclosure, the light source module comprises a light source board and lamp beads fixed on the light source board, the reflective cup is provided with a reflecting cavity corresponding to the lamp beads, and the lens component is formed with a prism surface corresponding to the reflecting cavity, the anti-glare cup is provided with an anti-glare cavity corresponding to the reflecting cavity, and light emitted from the lamp beads passes through the reflecting cavity, the prism surface, and the anti-glare cavity in turn and is emitted outwards.

As a further improvement of the disclosure, the reflective cup is provided with a connecting member and a connecting hole in the connecting member, and the optical assembly further comprises a fixing piece which passes through the connecting hole and is connected with the light source board.

As a further improvement of the disclosure, the connecting member is provided with a bump, the light source board is provided with a through hole matched with the bump, and the bump is accommodated in the through hole.

As a further improvement of the disclosure, the reflective cup is further provided with a support post, and the support post and the connecting member are arranged on a same side of the reflective cup and protrude toward the light source board so as to abut against the light source board respectively.

In order to achieve the above purpose, the disclosure further provides a linear lamp, which includes a lamp body and any one of the above-mentioned optical assemblies accommodated in the lamp body.

As a further improvement of the disclosure, the lamp body comprises a lamp holder, a lamp head and a rotating shaft, the optical assembly is accommodated in the lamp head, and the rotating shaft is arranged at a joint of the lamp holder and the lamp head, so that the lamp head is rotatable relative to the lamp holder.

As a further improvement of the disclosure, the lamp head comprises a main body part and a connecting part protruding outward from the main body part, and the lamp holder is provided with an adapting part and a connecting groove located beside the adapting part, the connecting part is accommodated in the connecting groove, and the connecting part is rotatably connected with the adapting part through the rotating shaft.

As a further improvement of the disclosure, the rotating shaft comprises a rotating part and a position limiting groove in the rotating part, a position limiting piece is arranged in the adapting part, and the position limiting piece partially extends into the position limiting groove, and is capable of sliding in the position limiting groove, and the position limiting piece is configured to abut against an inner side wall of the position limiting groove to limit a rotation angle of the rotating shaft.

As a further improvement of the disclosure, the adapting part further comprises an anti-skid piece, and one end of the anti-skid piece abuts against an outer side wall of the rotating shaft, so that the rotating shaft is capable of keeping stationary relative to the anti-skid piece or is capable of sliding relative to the anti-skid piece.

As a further improvement of the disclosure, the rotating shaft comprises a fixing part, and a locking groove and a positioning groove formed in the fixing part, the connecting part is provided with a positioning post and a locking piece, the positioning post is accommodated in the positioning groove, and the locking piece abuts against the locking groove, so that the connecting part is fixedly connected with the rotating shaft and is rotatable synchronously with the rotating shaft.

In order to achieve the above purpose, the disclosure further provides a linear lamp combination, which includes an adapter and a linear lamp fixedly connected with the adapter, in which the linear lamp comprises a lamp body and any one of the above-mentioned optical assemblies accommodated in the lamp body.

As a further improvement of the disclosure, the lamp body comprises a rotating shaft, a lamp head and a lamp holder, the optical assembly is accommodated in the lamp head, and the lamp head is rotatably connected with the lamp holder through the rotating shaft, the adapter is fixedly connected with the lamp holder.

In order to achieve the above purpose, the disclosure further provides a track linear lamp, which includes a track and any one of the above-mentioned linear lamp combinations, in which the adapter is accommodated in the track and the linear lamp is at least partially accommodated in the track.

The disclosure has the following beneficial effects: in the disclosure, the reflective cup of the optical assembly is provided with a snap-fit slot, the lens component is provided with a first hook corresponding to the snap-fit slot, the anti-glare cup is provided with a second hook corresponding to the snap-fit slot, so that both the lens component and the anti-glare cup can be buckle fixed with the reflective cup, which achieves accurate installation of the lens component and convenient assembly of the optical component.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples are only used to illustrate the technical scheme of the disclosure, but not used to limit the disclosure. Although the disclosure has been described in detail with reference to the examples, ordinary people in the field should understand that the technical scheme of the disclosure can be modified or replaced by equivalents without departing from the spirit and scope of the technical scheme of the disclosure.

The invention claimed is:

1. An optical assembly, comprising: a light source module, a reflective cup, a lens component, and an anti-glare cup which are sequentially arranged in a height direction, wherein:

an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into a corresponding snap-fit slot, and the reflective cup, the lens component, and the anti-glare cup are connected in a snap-fit manner, wherein the second hook is disposed adjacent to an anti-glare cavity of the anti-glare cup, the lens component is formed with a prism surface corresponding to a reflecting cavity of the reflective cup, and the first hook is disposed adjacent to the prism surface.

2. The optical assembly according to claim 1, wherein:

the edge of the lens component is recessed inward to form a groove, and the groove and the snap-fit slot at least partially correspond to each other, so that the second hook passes through the groove and is inserted into the corresponding snap-fit slot.

3. The optical assembly according to claim 1, wherein:

the light source module comprises a light source board and lamp beads fixed on the light source board, the reflective cup is provided with the reflecting cavity corresponding to the lamp beads, the anti-glare cup is provided with the anti-glare cavity corresponding to the reflecting cavity, and light emitted from the lamp beads passes through the reflecting cavity, the prism surface, and the anti-glare cavity in turn and is emitted outwards.

4. The optical assembly according to claim 3, wherein:

the reflective cup is provided with a connecting member and a connecting hole in the connecting member, and the optical assembly further comprises a fixing piece which passes through the connecting hole and is connected with the light source board.

5. The optical assembly according to claim 4, wherein:

the connecting member is provided with a bump, the light source board is provided with a through hole matched with the bump, and the bump is accommodated in the through hole.

6. The optical assembly according to claim 4, wherein:

the reflective cup is further provided with a support post, and the support post and the connecting member are arranged on a same side of the reflective cup and protrude toward the light source board so as to abut against the light source board.

7. A linear lamp, comprising: a lamp body and an optical assembly accommodated in the lamp body, wherein:

the optical assembly comprises a light source module, a reflective cup, a lens component, and an anti-glare cup which are sequentially arranged in a height direction, an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into the corresponding snap-fit slot, and the reflective cup, the lens component, and the anti-glare cup are connected in a snap-fit manner, wherein the second hook is disposed adjacent to an anti-glare cavity of the anti-glare cup, the lens component is formed with a prism surface corresponding to a reflecting cavity of the reflective cup, and the first hook is disposed adjacent to the prism surface.

8. The linear lamp according to claim 7, wherein:

the lamp body comprises a lamp holder, a lamp head and a rotating shaft, the optical assembly is accommodated in the lamp head, and the rotating shaft is arranged at a joint of the lamp holder and the lamp head, so that the lamp head is rotatable relative to the lamp holder.

9. The linear lamp according to claim 8, wherein:

the lamp head comprises a main body part and a connecting part protruding outward from the main body part, and the lamp holder is provided with an adapting part and a connecting groove located beside the adapting part, the connecting part is accommodated in the connecting groove, and the connecting part is rotatably connected with the adapting part through the rotating shaft.

10. The linear lamp according to claim 9, wherein:

the rotating shaft comprises a rotating part and a position limiting groove in the rotating part, a position limiting piece is arranged in the adapting part, and the position limiting piece partially extends into the position limiting groove, and is capable of sliding in the position limiting groove, and the position limiting piece is configured to abut against an inner side wall of the position limiting groove to limit a rotation angle of the rotating shaft.

11. The linear lamp according to claim 9, wherein:

the adapting part further comprises an anti-skid piece, and one end of the anti-skid piece abuts against an outer side wall of the rotating shaft, so that the rotating shaft is capable of keeping stationary relative to the anti-skid piece or is capable of sliding relative to the anti-skid piece.

12. The linear lamp according to claim 9, wherein:

the rotating shaft comprises a fixing part, and a locking groove and a positioning groove formed in the fixing part, the connecting part is provided with a positioning post and a locking piece, the positioning post is accommodated in the positioning groove, and the locking piece abuts against the locking groove, so that the connecting part is fixedly connected with the rotating shaft and is rotatable synchronously with the rotating shaft.

13. A linear lamp combination, comprising: an adapter and a linear lamp fixedly connected with the adapter, wherein:

the linear lamp comprises a lamp body and an optical assembly accommodated in the lamp body, the optical assembly comprises a light source module, a reflective cup, a lens component, and an anti-glare cup which are sequentially arranged in a height direction, an edge of the reflective cup is provided with a snap-fit slot, and an edge of the lens component is provided with a first hook in a protruding manner, the anti-glare cup is provided with a second hook in a protruding manner, the first hook and the second hook extend in a same direction so as to be inserted into a corresponding snap-fit slot, and the reflective cup, the lens component, and the anti-glare cup are connected in a snap-fit manner, wherein the second hook is disposed adjacent to an anti-glare cavity of the anti-glare cup, the lens component is formed with a prism surface corresponding to a reflecting cavity of the reflective cup, and the first hook is disposed adjacent to the prism surface.

14. The linear lamp combination according to claim 13, wherein:

the lamp body comprises a rotating shaft, a lamp head and a lamp holder, the optical assembly is accommodated in the lamp head, and the lamp head is rotatably connected with the lamp holder through the rotating shaft, the adapter is fixedly connected with the lamp holder.

* * * * *